United States Patent

Ruchat et al.

Patent Number: 5,557,888
Date of Patent: Sep. 24, 1996

[54] OPEN AND CLOSE CONTROL DEVICE FOR A HORIZONTALLY SLIDABLE VEHICLE DOOR

[76] Inventors: Rene Ruchat, 26a, Chemin de Pont-Ceard, CH-1290 Versoix; Bernard Planche, Chemin de la Chesnaie, CH-1219 Chatelaine, both of Switzerland; Jean Roch, 721, route de Vésegnin, F-01280 Prevessin Moens, France

[21] Appl. No.: 284,609

[22] PCT Filed: Feb. 24, 1993

[86] PCT No.: PCT/FR93/00178

§ 371 Date: Oct. 7, 1994

§ 102(e) Date: Oct. 7, 1994

[87] PCT Pub. No.: WO93/17211

PCT Pub. Date: Sep. 2, 1993

[30] Foreign Application Priority Data

Feb. 28, 1992 [FR] France ................................ 92 02622

[51] Int. Cl.⁶ ...................................................... E05F 11/34
[52] U.S. Cl. ................. 49/362; 49/210; 49/213; 296/155
[58] Field of Search .................. 49/362, 210, 213, 49/214, 360; 296/155, 146.1

[56] References Cited

U.S. PATENT DOCUMENTS

| 2,951,390 | 9/1960 | Martens et al. | 49/362 X |
| 3,343,302 | 9/1967 | Browning et al. | 49/362 X |
| 4,056,276 | 11/1977 | Jarvis . | |
| 4,409,905 | 10/1983 | Zerbi | 49/362 X |
| 4,662,109 | 5/1987 | Yui et al. | 49/214 |
| 5,069,000 | 12/1991 | Zuckerman | 49/360 X |
| 5,083,397 | 1/1992 | Koura | 49/360 X |
| 5,085,094 | 2/1992 | Clawson et al. | 49/362 X |

FOREIGN PATENT DOCUMENTS

| 0321958 | 6/1989 | European Pat. Off. . | |
| 0478536 | 4/1992 | European Pat. Off. . | |
| 2562134 | 10/1985 | France | 49/362 |
| 1930485 | 1/1971 | Germany . | |
| 2036560 | 2/1972 | Germany . | |
| 2159208 | 11/1985 | United Kingdom . | |

Primary Examiner—Philip C. Kannan
Attorney, Agent, or Firm—Henderson & Sturm

[57] ABSTRACT

An open-and-close control device for a horizontally slidable vehicle door fitted with a lock that includes a horizontal endless screw rotatably, movably held within a rail fixed to a vehicle body adjacent the vehicle door, and adapted to be rotated by a rotary electric motor. The horizontal endless screw engages a threaded aperture in a slide translationally movable in the rail, wherein the slide is connected by a single connecting rod to an inner arm positioned on the vehicle door. The arm is oriented towards an inside of the vehicle body such that the single connecting rod is at an angle of less than about 25° to the horizontal endless screw. Opening the vehicle door is initiated by a substantially outward transverse translation of at least part of the vehicle door.

20 Claims, 3 Drawing Sheets

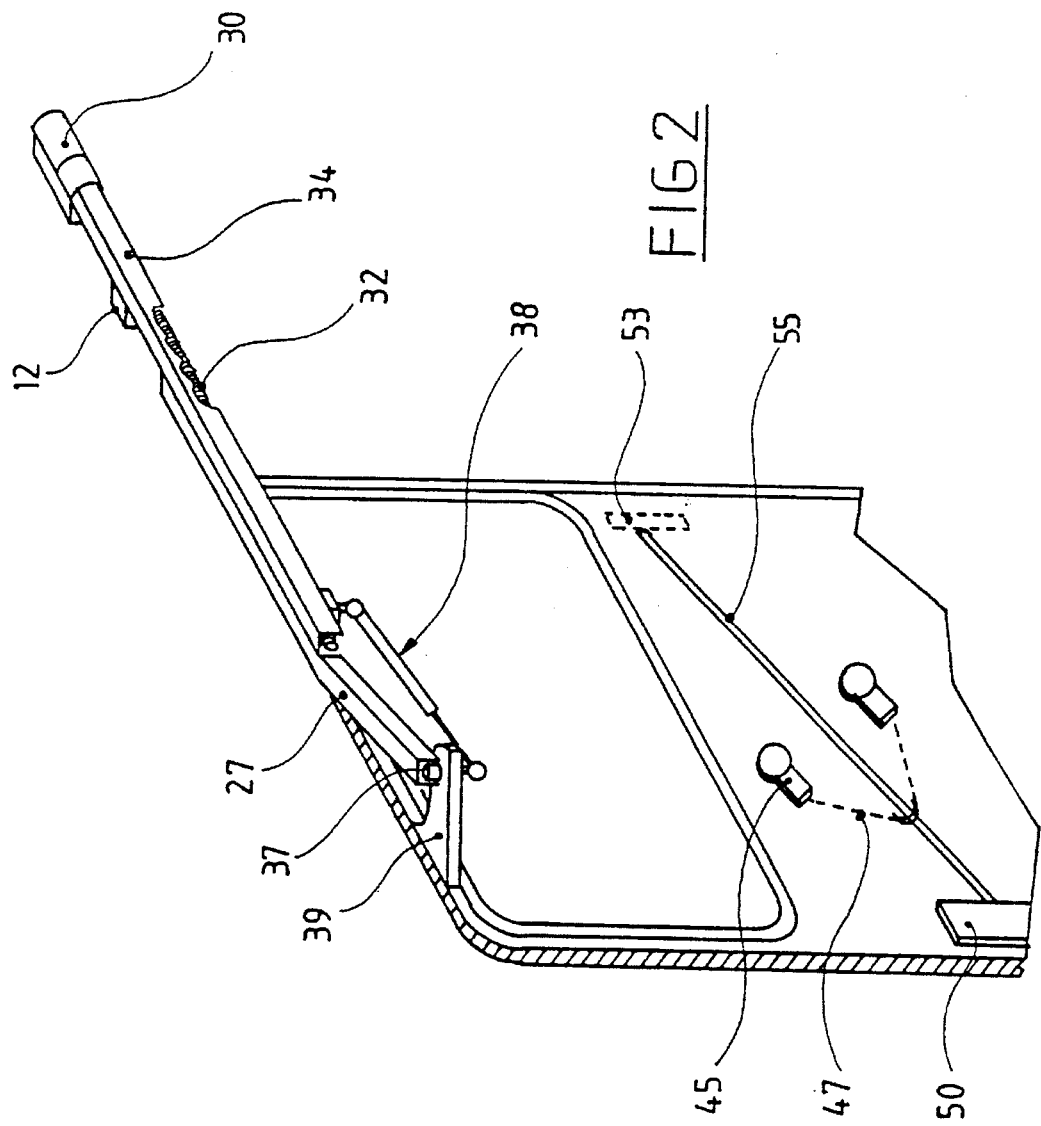

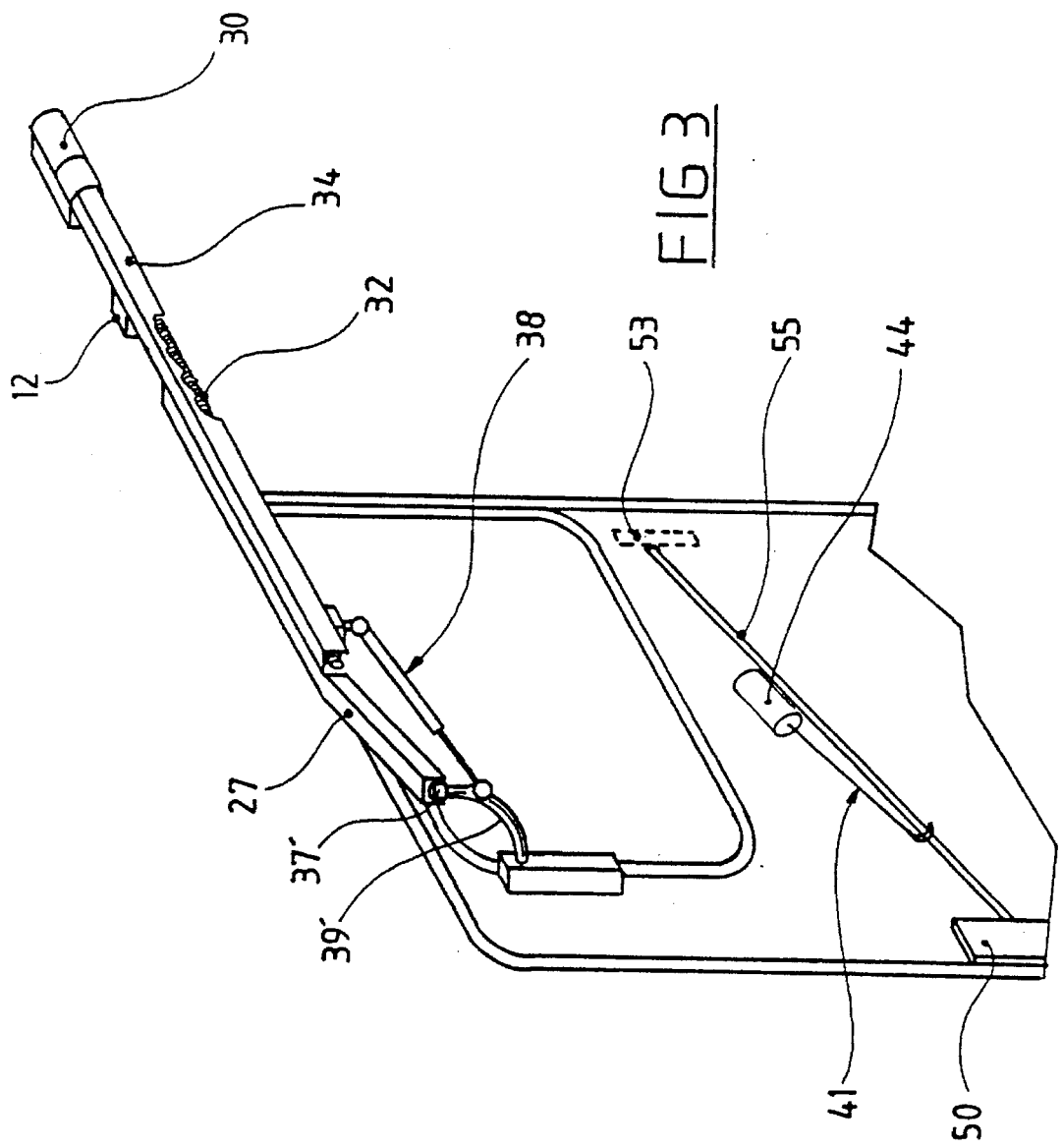

OPEN AND CLOSE CONTROL DEVICE FOR A HORIZONTALLY SLIDABLE VEHICLE DOOR

The present invention relates to an open-and-close control device for a horizontally slidable vehicle door, more particularly to a lateral door wherein the opening of the door begins with a simultaneous outward transverse translation of at least a part of the door and then continues by sliding along the lateral wall of the vehicle body. This double movement at the beginning of opening, but also at the end of closing, renders the problem of the automatic opening and closing of such doors somewhat difficult to resolve, A known device of this type comprises a telescopic pneumatic jack fitted horizontally against the inner wall of the vehicle body above the rear window and of which the end of the mobile rod is articulated to a slide slidably mounted in a guide. This slide is connected by a connecting rod to the end of a vertical elbow arm pivotally mounted in the sliding door and coupled to the handle controlling opening of the lock. Hence, withdrawal of the jack's rod causes the slide to withdraw, which via the connecting rod firstly produces pivoting of the arm to free the lock, then a rearward traction on the same arm producing opening of the door.

However, in this pneumatic device, an entire part of the circuit, notably the compressor, the compressed air supply, the supply lines and the jack remain permanently under pressure, which may be particularly dangerous for passengers in case of an explosion following a traffic accident, or if one of the parts should rupture due to premature wear due to the constraints and stresses present in a vehicle. Moreover, the locking and unlocking device for the sliding door with an elbow-lever is particularly complex, which reduces its long term reliability. Additionally, this device cannot provide a sufficient forward thrust at adequate speed to close the door and lock it when the vehicle is on an incline, the maximum acceptable pressure being still too small. Finally, and above all, this device is particularly expensive to produce.

Another device of this type described in DE 1 930 485 comprises a horizontal endless screw held mobile in rotation against the vehicle body above the door, this screw being on the one hand engaged in the threaded orifice of a first mobile slide which is mobile in translation along the screw and on the other hand may be turned by a rotary electric motor. This first slide is connected to a second slide mobile in translation along a slot fixed also to the vehicle body parallel to and under the endless screw. This second slide is connected to the upper front angle of the door by a connection supporting the weight of the door and consequently comprising on the one hand a pendular pare mounted on a horizontal hinge of the slide and, on the other hand, a plate bolted to the door and assembled to the pendular part by two threaded rods for adjusting the height.

However, this device is unnecessarily complex, hence expensive to produce, because the weight of the sliding door is generally already supported by another guide rail for the door situated either half-way up or at the bottom. Moreover, connection with the door can only be rigid because it is working under shear stress equally during opening and during closing of the door, which implies jerky movements as soon as there are any momentaneous difficulties in sliding of the door or of the slide.

The aim of the present invention is a device for controlling the opening and closing of a sliding vehicle door which is efficient, i.e. is apt to impose the movement to the door in all circumstances and even after multiple uses, but which is also smooth and rapid in operation. Moreover, the conception of this device must be sufficiently simple for it to be made in a rigid manner, at an affordable cost and so that it can be fitted without difficulty to existing vehicles.

These aims are achieved thanks to a device comprising a horizontal endless screw which is rotatably movably held within a rail fixed to the vehicle body above (or below) the door, which screw, on the one hand, engages a threaded aperture in a slide which is translationally movable in said rail and, on the other hand, may also be rotated by a rotary electric motor, the slide being connected to the door by a single connecting rod which is substantially horizontal and is oriented along the axis of the endless screw, this connecting rod hence operating in thrust and in traction in its longitudinal direction. In other words, this connecting rod preferably has an angle of less than 25° to said endless screw.

When opening of the door begins with a simultaneous outward transverse translation of at least a part of the door so that the later movement of this door can take place along the lateral wall of the vehicle body, it has turned out to be useful to connect the connecting rod to an arm oriented towards the inside of the vehicle, which arm is pre-existing or is fitted on the door.

Inwardly-directed off-setting of the point of traction exerted by the end of the connecting rod on the door, and the fact that this connecting rod is substantially located in a horizontal plane allow, during unlocking, to apply, in addition to the rearwardly-directed traction, an outwardly-directed component which assists the initial transverse movement of this door. From thereon, the off-setting created by this arm has for result that the exerted traction remains in line with the endless screw, which cancels any lateral force between the slide and the endless screw during the greater part of the rearward movement.

In certain types of vehicles with sliding doors, such an inner arm exists and supports a pivot or a roller sliding in a horizontal guide rail fixed above the door against the vehicle body. In such case, it is judicious to install the rail containing the endless screw and the slide parallel to one another against the lateral inner face of this guide rail in the horizontal plane. The end of the connecting rod is thus directly connected to this arm, preferably adjacent to the guide roller which particularly minimizes jamming forces.

Advantageously, the connecting rod is gas or spring shock absorber providing a certain smoothness of movement.

After many workshop tests, it has been shown that the use of an endless screw having a pitch of its thread comprised between 10 and 15 mm and turning at a speed comprised between 2000 and 4000 r.p.m. gives particularly satisfactory results as regards the speed of displacement of the door for a reasonable power of the electric motor. For high rotational speeds, it is possible to consider a direct connection with the electric motor. For low rotational speeds, it is however preferred to combine an electric motor turning at its optimum speed comprised between 4000 and 6000 r.p.m. with a reducing gear having a reduction factor of 2 or 3.

In order to minimize maintenance, particularly lubrication and to minimize operating noise, it has appeared particularly advantageous to use an endless screw made of stainless steel sold under the name INOX and to overmold the slide in synthetic material around a nut which itself is provided in synthetic material sold under the name TEFLON.

The lock of the sliding door may advantageously be actuated directly by an electromagnet, or at the level of a reversing lever of a control rod connected to an outside or inside handle of the door. If the sliding door comprises a single control rod connecting the lock to an outside or inside door handle, it may be advantageous to use a pair of linear electric actuators arranged on either side of and in the vertical plane of the control rod, the latter being connected to the actuators by a cable or by a pair of rods disposed symmetrically relative to the control rod.

The supply of electric current to the electromagnet or to the linear electric actuators from the vehicle's source of electricity takes place, between the door and the vehicle body, preferably via elastically mobile fingers that contact corresponding contacts.

The invention is described in further detail by way of non-limiting examples illustrated in the accompanying drawings, in which:

FIG. 2 is a schematic perspective view of a second embodiment of the device; and FIG. 3 is a schematic perspective view of a variant of the second embodiment of device.

Figure 1:
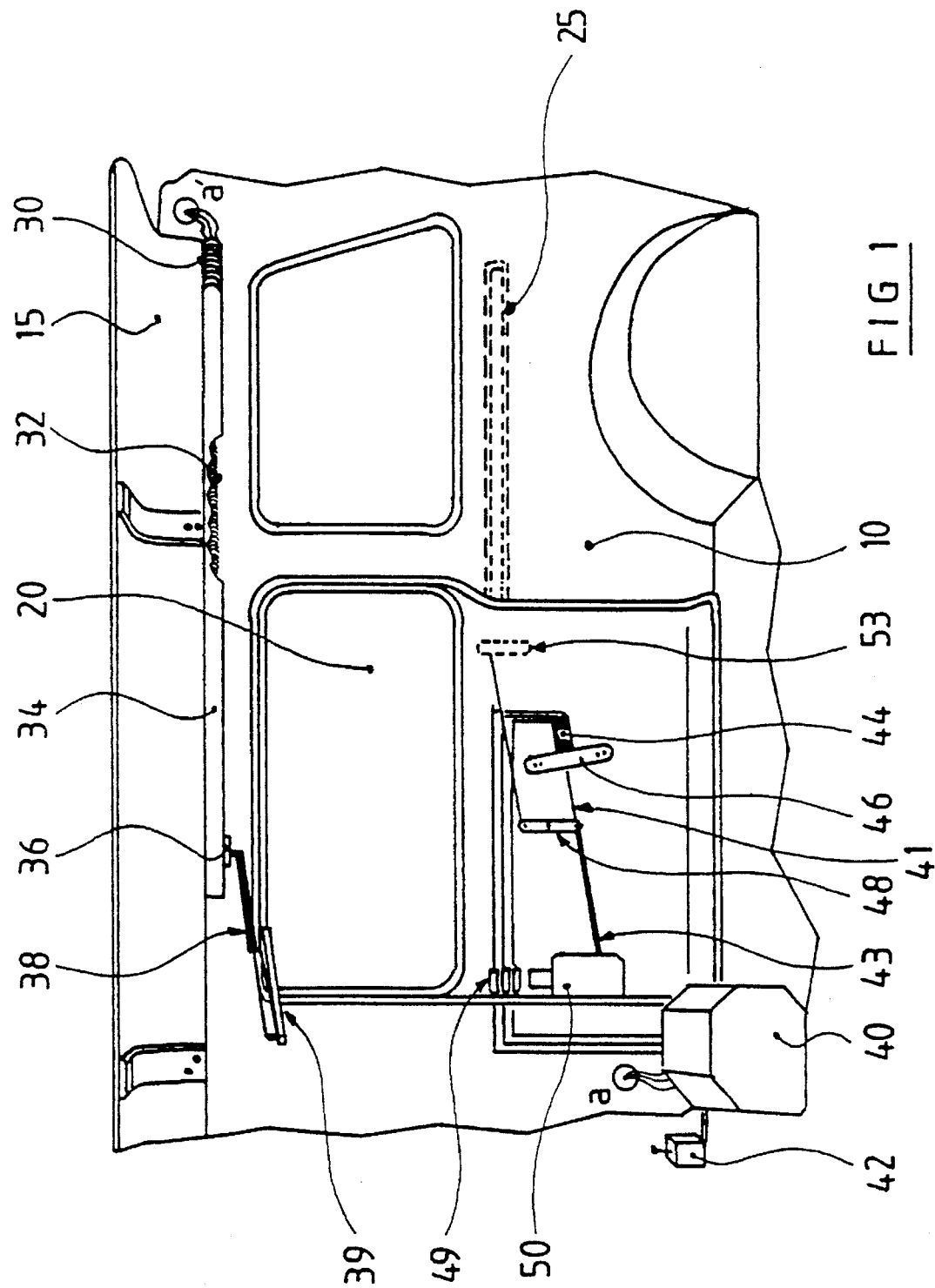
FIG. 1 is a schematic view, from the inside of a vehicle, of a lateral sliding door fitted with a first embodiment of the device.

FIG. 1 schematically shows a lateral wall 10 of the body of a vehicle such as a minibus or a van, comprising a lateral sliding door 20. In this example, the sliding door 20 is guided in a sub-jacent groove, not shown, and by a slide 25 on the outer face of the vehicle body.

This device comprises a rail 34 mounted horizontally against the inner face of the vehicle body 10 adjacent the beginning of the roof 15. This rail 34 contains an endless screw 32 mounted rotably in bearings. This endless screw may be turned by a rotary electric motor 30 installed at the rear end of rail 34. This electric motor is supplied with electric current from a battery 40 by wires passing inside the vehicle body from point a to point a'. This rail 34 comprises additionally a slide 36 which is mobile only in translation and which is engaged in a threaded aperture by the endless screw 32. This slide 36 comprises in its lower part an attachment point for a connecting rod 38 whose other end is connected to the inner end of an internal arm 39 fixed in the upper forward part of the sliding door 20. This connecting rod is thus oriented close to horizontal and to the longitudinal axis of the rail, at an angle less than 25°, in fact of the order of 15°.

Advantageously, the rail 34 is made from an aluminium profiled section whose external lateral surface, as well an upper surface inclined at 45° both have a groove for engaging with parts which enable this rail to be fixed against the inner wall of the vehicle body 10. Apart from the qualities of rigidity and lightness of a such profiled aluminium part, such a part may easily be repainted later.

The length of the endless screw 32 is about 10 to 30 cm greater than the length of the sliding door, and its diameter is of the order of 15 mm. Moreover, the pitch of this screw is comprised between 10 and 15 mm, preferably 12.5 mm.

The electric motor 30 is a d.c. motor supplied at 12 Volts by the vehicle battery 40 via a control switch 42. This motor must have a power greater than 100 Watts, and preferably greater than 150 Watts and must turn the endless screw at a speed of the order of 2000 to 4000 r.p.m., preferably 3000 r.p.m. Electric motors having these previously cited characteristics are now available in the market in casings less than 40 mm whereby they can be installed directly in extension of the endless screw at the rear end of the rail, if necessary with intercalation of a reducing gear having a reduction factor of 2 or 3 to preferably maintain its rotating speed at a nominal value of the order of 6000 r.p.m.

The endless screw 32 is made of stainless steel sold under the name INOX, and this screw is fitted with a nut of self-lubricating synthetic material sold under the name TEFLON. The slide 36 is simply made by over-molding a plastic piece around this nut. This slide 36 could be machined from a metal block and could include an internal orifice provided with recirculating balls relative to the pitch of the endless screw 32, but this embodiment requires regular lubrication and is noisier during operation.

The substantially horizontal connecting rod 38 between the slide 36 and the internal arm 39 of door 20 is preferably a small gas shock absorber avoiding abruptness during movements, which abruptness is always negative for the lifetime of the component parts of the device. Each end of this connecting rod comprises a spherical cap which comes to engage in a spherical head respectively of the slide and of the arm, this type of connection enabling large angular variations, equally vertically and horizontally. Moreover, this type of connection may be easily released if it appears momentaneously necessary to uncouple the sliding door 20 from the automatic opening and closing device.

FIGS. 2 and 3 illustrate a more commonly encountered sliding door and already comprising an inner arm 39, 39' carrying at its end a roller or guide pivot 37, 37' engaged in a guide rail 27 fixed horizontally against the internal wall of the vehicle body. As can be seen, this guide rail 27 comprises a first oblique part guiding the door 20 in a simultaneous translation towards the rear and towards the outside enabling the withdrawal of the door from the vehicle body before sliding parallel to the lateral rear wall. In this case, and as illustrated in these FIGS. 2 and 3, the rail 34 is installed against the guide rail 27, the front end thereof arriving substantially at the end of the oblique part of the guide rail. If necessary, the rear part 34 and the electric motor 30 are mounted on blocks 12. Advantageously, the front end of the connecting rod 38 is connected to a spherical pivot provided in the vertical axis of the guide pivot 37 or in the proximity of the roller 37'.

As illustrated in FIG. 1, the lock 50 of sliding door 20 is connected to the external handle 53 by a control rod 43 in two parts connected in the middle by a reversing lever 48. It is thus possible to install an electromagnet 44 on a support 46 so that its output rod 41 is directly in extension of the control rod 43 emerging from the lock 50. This electromagnet 44 operates to actuate the lock 50 just at the moment of opening of the door.

For this purpose, this electromagnet is energized from the vehicle battery 40 under control of switch 42 via cables whose connection between the vehicle body 10 and the door 20 is provided by a device with fingers 49 mounted in the thickness of the door 20 and pushed forwardly by rear springs, these finger touching corresponding contacts provided in the thickness of the door's upright. It is also possible to envisage mounting the contact fingers 49 in the thickness of the door upright, and contacts in the thickness of the door.

When the connection between the external handle 53 and the lock 50 is provided by means of a single rod 55 as shown in FIG. 2, which is so in the majority of cases, it is possible to install a pair of linear electric actuators 45 in the vertical plane of the door and arranged symmetrically relative to this control rod 55. These actuators are thus connected by a cable 47 making an angle between 20° and 45° relative to the rod. Of course, this cable 47 may be replaced by two connecting rods, but these would be heavier and more expensive to provide. The linear actuators may be of the "door motor" type available in commerce and comprising a very flat electric motor arranged transversally relative to a rack which is engaged in the toothed wheel mounted on the motor's output shaft.

When the connection between the external handle 53 and the lock 50 is provided by a single rod 55 as illustrated in FIG. 3, it is also possible to install a linear electric actuator 44 parallel to and adjacent to this control rod 55. This actuator is thus directly connected by a rod 41 to the lock 50.

As can be readily understood, the tipping of the control switch 42 in a first position called the "open" position, causes the supply of electric current simultaneously to the electromagnet 44 (or to the linear electric actuators 45) and to the rotary electric motor 30. The lock 50 is immediately unlocked; rotation of the endless screw 32, driving the slide 36 rearwardly, causes a traction in the same direction of the shock absorber 38 on the arm 39 of door 20, the latter beginning its opening movement. Taking into account the speed of rotation of the motor and the pitch of the endless screw 32, this opening movement is particularly rapid of the order of two seconds. Conversely, tipping of the control switch 42 into a second "closed" position causes supply solely of the rotating electric motor 30 with inverted polarity relative to opening. The slide 36 is thus driven in a forced advancing movement, which produces a thrust of the shock absorber 38 on the arm 39 with a force and a speed sufficient to cause, at the end of the path, reinsertion of the door 20 into the upright by a forward and inward translation followed by a clean engagement of the lock 50. During this reinsertion movement, the substantially horizontal orientation of the connection rod 38 as well as its articulated connection are much appreciated.

The use of electric power also enables the addition of a safety device. Should the door be jammed, in particular if it is closed against a passenger, an overload in the electric supply of the motor 30 can be immediately detected by an electric comparator to immediately switch off the supply or invert it to cause a partial withdrawal of the door.

Moreover, this electrical device lends itself to a remote control replacing the control switch 42.

We claim:

1. An open-and-close control device for a horizontally slidable vehicle door fitted with a lock, said control device comprising a horizontal endless screw rotatably movably held within a rail fixed to a vehicle body adjacent said vehicle door, and adapted to be rotated a rotary electric motor, wherein said horizontal endless screw engages a threaded aperture in a slide translationally movable in said rail, wherein said slide is connected by a single connecting rod to an inner arm positioned on said vehicle door, said arm being oriented towards an inside of said vehicle body, wherein said single connecting rod is at an angle of less than about 25° to said horizontal endless screw, and opening said vehicle door is initiated by a substantially outward transverse translation of at least part of said vehicle door.

2. A device according to claim 1, wherein said inner arm carries a member selected from a group consisting of a pivot and a roller sliding in a horizontal guide rail fixed above said vehicle door against the vehicle body, wherein the rail containing said endless screw and said slide is fixed parallel in a horizontal plane against an inner face of said guide rail.

3. A device according to claim 2, wherein said endless screw comprises a thread with a pitch and said pitch of the thread of the endless screw comprises between about 10 and about 15 millimeters, and said endless screw is adapted to turn at a speed between about 2000 and about 4000 r.p.m.

4. A device according to claim 2, wherein said endless screw comprises stainless steel.

5. A device according to claim 2, wherein said sliding door comprising a lock adapted to be actuated directly by a member selected from a group consisting of an electromagnetic and a reversing lever of a control rod connected to a handle mounted on said vehicle door.

6. A device according to claim 2, wherein said lock of said vehicle door is adapted to be actuated by a pair of linear electric actuators disposed on either side, in a vertical plane, of a control rod connected to a handle mounted on said vehicle door, said control rod being connected in a symmetrical fashion to said linear electric actuators by a member selected from a group consisting of a cable and a pair of rods.

7. A device according to claim 1, wherein said endless screw comprises a thread with a pitch and said pitch of the thread of the endless screw comprises between about 10 and about 15 millimeters, and said endless screw being adapted to turn at a speed between about 2000 and about 4000 r.p.m.

8. A device according to claim 7, wherein said endless screw comprises stainless steel.

9. A device according to claim 7, wherein said sliding door comprising a lock adapted to be actuated directly by a member selected from a group consisting of an electromagnetic and a reversing lever of a control rod connected to a handle mounted on said vehicle door.

10. A device according to claim 7, wherein said lock of said vehicle door is adapted to be actuated by a pair of linear electric actuators disposed on either side, in a vertical plane, of a control rod connected to a handle mounted on said vehicle door, said control rod being connected in a symmetrical fashion to said linear electric actuators by a member selected from a group consisting of a cable and a pair of rods.

11. A device according to claim 1, wherein said endless screw comprises stainless steel.

12. A device according to claim 11, wherein said sliding door comprising a lock adapted to be actuated directly by a member selected from a group consisting of an electromagnetic and a reversing lever of a control rod connected to a handle mounted on said vehicle door.

13. A device according to claim 11, wherein said lock of said vehicle door is adapted to be actuated by a pair of linear electric actuators disposed on either side, in a vertical plane, of a control rod connected to a handle mounted on said vehicle door, said control rod being connected in a symmetrical fashion to said linear electric actuators by a member selected from a group consisting of a cable and a pair of rods.

14. A device according to claim 1 wherein said sliding door comprises a lock adapted to be actuated directly by a member selected from a group consisting of an electromagnet and a reversing lever of a control rod connected to a handle mounted on said vehicle door.

15. A device according to claim 14 wherein a supply of electric current to a member selected from a group consisting of said electro-magnet and a linear electric actuator from a source of electricity for said vehicle takes place between said vehicle door and said vehicle body by elastically mobile fingers operably associated with corresponding contacts.

16. A device according to claim 14, wherein said lock of said vehicle door is adapted to be actuated by a pair of linear electric actuators disposed on either side, in a vertical plane, of a control rod connected to a handle mounted on said vehicle door, said control rod being connected in a symmetrical fashion to said linear electric actuators by a member selected from a group consisting of a cable and a pair of rods.

17. A device according to claim 1, wherein said lock of said vehicle door is adapted to be actuated by a pair of linear electric actuators disposed on either side, in a vertical plane, of a control rod connected to a handle mounted on said vehicle door, said control rod being connected in a symmetrical fashion to said linear electric actuators by a member selected from a group consisting of a cable and a pair of rods.

18. A device according to claim 17, wherein a supply of electric current to a member selected from a group consisting of said electro-magnet and linear electric actuators from a source of electricity for said vehicle takes place between said vehicle door and said vehicle body, by elastically mobile fingers operably associated with corresponding contacts.

19. A device according to claim 1, wherein said sliding door comprising a lock adapted to be actuated directly by a member selected from a group consisting of an electromagnetic and a reversing lever of a control rod connected to a handle mounted on said vehicle door.

20. A device according to claim 1, wherein said lock of said vehicle door is adapted to be actuated by a pair of linear electric actuators disposed on either side, in a vertical plane, of a control rod connected to a handle mounted on said vehicle door, said control rod being connected in symmetrical fashion to said linear electric actuators by a member selected from a group consisting of a cable and a pair of rods.

* * * * *